(12) United States Patent
Ryu et al.

(10) Patent No.: US 10,504,648 B2
(45) Date of Patent: Dec. 10, 2019

(54) ANTENNA FOR WIRELESS POWER TRANSMISSION

(71) Applicant: AMOTECH CO., LTD., Incheon (KR)

(72) Inventors: Kyung Hyun Ryu, Seoul (KR); Hyung Il Baek, Yongin (KR); Wong Jin Seok, Suwon (KR); Yong Gil Jo, Goyang (KR)

(73) Assignee: AMOTECH CO., LTD., Incheon (KR)

( * ) Notice: Subject to any disclaimer, the term of this patent is extended or adjusted under 35 U.S.C. 154(b) by 114 days.

(21) Appl. No.: 15/847,877

(22) Filed: Dec. 19, 2017

(65) Prior Publication Data

US 2018/0174746 A1    Jun. 21, 2018

(30) Foreign Application Priority Data

Dec. 20, 2016    (KR) .................. 10-2016-0174554
Dec. 20, 2016    (KR) .................. 10-2016-0174555

(51) Int. Cl.
*H01F 38/14*    (2006.01)
*H02J 50/12*    (2016.01)
*H01F 27/28*    (2006.01)

(52) U.S. Cl.
CPC ............. *H01F 38/14* (2013.01); *H01F 27/28* (2013.01); *H02J 50/12* (2016.02)

(58) Field of Classification Search
CPC ............ H02J 5/005; H02J 7/025; H02J 17/00; H02N 2/008; H04B 5/0025–0093; B60L 5/005; B60L 11/182; B60L 11/1829; B60L 11/1831; B60L 53/12–126; Y02T 90/122; H01F 27/006; H01F 27/02; H01F 38/14; H01F 2038/143–146; H01R 13/6633; A61B 1/00029; A61N 1/3787
USPC ........................................ 307/104; 320/108
See application file for complete search history.

(56) References Cited

U.S. PATENT DOCUMENTS

2013/0154383 A1*   6/2013   Kasturi ................ H04B 5/0087
                                                         307/104
2013/0328412 A1*  12/2013   Meins ..................... H01F 38/14
                                                         307/104

FOREIGN PATENT DOCUMENTS

KR         101535048 B1    7/2015
KR       20150107281 A     9/2015
KR         101584800 B1    1/2016

* cited by examiner

*Primary Examiner* — Rexford N Barnie
*Assistant Examiner* — Thai H Tran
(74) *Attorney, Agent, or Firm* — Gokalp Bayramoglu

(57) ABSTRACT

An antenna for wireless power transmission. A first coil portion includes a first outer coil portion and a first inner coil portion. A second coil portion includes a second outer coil portion and a second inner coil portion. The first coil portion and the second coil portion are disposed to overlap and intersect each other at one or more points. In a state in which the first coil portion and the second coil portion are overlapped, bends of the first coil portion and the second coil portion overlap and intersect each other. All of the bends of the first outer coil portion are located above the bends of the second outer coil portion or all of the bends of the second outer coil portion are located above the bends of the first outer coil portion. Uniform charging efficiency is obtained across entire areas.

7 Claims, 5 Drawing Sheets

|  | S11 R | S11 X | S21 R | S21 X | S12 R | S12 X | S22 R | S22 X |
|---|---|---|---|---|---|---|---|---|
| | | | | | | | | [Unit : dB] |
| Min Z21 | -8.38E-01 | -2.74E-01 | -2.89E-02 | 2.97E-01 | -2.92E-02 | 2.96E-01 | -9.19E-01 | 9.22E-02 |
| Max Z21 (charge area) | -6.94E-01 | -5.14E-01 | -8.76E-02 | 3.55E-01 | -8.80E-02 | 3.54E-01 | -8.93E-01 | 1.06E-01 |
| ABS Max Z21 | -6.94E-01 | -5.14E-01 | -8.76E-02 | 3.55E-01 | -8.80E-02 | 3.54E-01 | -8.93E-01 | 1.06E-01 |
| Min ΔX | -6.77E-01 | -5.40E-01 | -9.27E-02 | 3.50E-01 | -9.31E-02 | 3.49E-01 | -8.94E-01 | 1.07E-01 |
| Max ΔX | -8.40E-01 | -2.61E-01 | -2.73E-02 | 3.03E-01 | -2.76E-02 | 3.02E-01 | -9.17E-01 | 9.17E-02 |

FIG. 4

| | RIT-Rs | | | | | | | |
|---|---|---|---|---|---|---|---|---|
| | RIT 3-2 | RIT 3-3 | RIT 4-4 | RIT 4-2 | RIT 4-3 | RIT 5-1 | RIT 5-2 | RIT 5-3 |
| General Information | | | | | | | | |
| Category | 3 | 3 | 4 | 4 | 4 | 5 | 5 | 5 |
| Voltage thresholds | | | | | | | | |
| $V_{BOOT}$ | 5.0 V | 4.0 V | 5.0 V | 5.0 V | | 5.0 V | | |
| $V_{MIN}$ | 6.0 V | 7.0 V | 8.5 V | 11.0 V | | 14.0 V | | |
| $V_{SET}$ | 7.0 V | 7.1 V | 10.0 V | 13.0 V | | 16.0 V | | |
| $V_{HIGH}$ | 16.0 V | 18.0 V | 24.0 V | 30.0 V | | 32.0 V | | |
| $V_{MAX}$ | 20.0 V | 20.8 V | 28.0 V | 35.0 V | | 36.0 V | | |
| $V_{ABS\_MAX}$ | 24.0 V | 25.0 V | 30.0 V | 40.0 V | | 40.0 V | | |
| Power thresholds | | | | | | | | |
| $P_{MIN}$ | 0.1 W | 0.072 W | 0.2 W | 0.35 W | | 0.20 W | | |
| $P_{BOOT}$ | 1.0 W | 0.3 W | 1.1 W | 1.0 W | | 1.1 W | | |
| $P_{MAX}$ | 3.7 W | 3.8 W | 8.6 W | 11.0 W | | 22.0 W | | |
| Maximum power resistance (RMP) | | | | | | | | |
| Maximum power point is less than | 17 Ω | 13 Ω | 5.8 Ω | 11.0 Ω | | 7 Ω | | |
| RIT Load range | | | | | | | | |
| ResistanceMin | 17 Ω | 13 Ω | 6.2 Ω | 11.0 Ω | | 8 Ω | | |
| ResistanceMax | 2000 Ω | 2000 Ω | 3000 Ω | 3500 Ω | | 3000 Ω | | |

FIG. 5

| Resonator current | $I_{TX}$(current mA$_{rms}$) | $I_{TX\_COIL}$(current mA$_{rms}$) |
|---|---|---|
| $I_{TX\_MIN}$ | 750 | 750 |
| $I_{TX\_SHORT\_BEACON\_MIN}$ | 900 | 900 |
| $I_{TX\_LONG\_BEACON\_MIN}$ | 900 | 900 |
| $I_{TX\_START}$ | 1000 | 1000 |
| $I_{TX\_NOMINAL}$ | 1225 | 1225 |
| $I_{TX\_MAX}$ | 1400 | 1400 |
| $I_{TX\_ABS\_MAX}$ | 1605 | 1605 |
| Max rising edge slew rate | 100 mA/ms | |

FIG. 6

ANTENNA FOR WIRELESS POWER TRANSMISSION

CROSS-REFERENCE TO RELATED APPLICATIONS

This application claims priority to and the benefit of Korean Patent Application No. 2016-0174554 and 2016-0174555, filed on Dec. 20, 2016, the contents of which are incorporated herein by reference in its entirety.

TECHNICAL FIELD

The present disclosure relates to an antenna for wireless power transmission.

BACKGROUND OF THE INVENTION

Recently, technology for charging various devices such as mobile devices in a wireless manner has been developed. Wireless power transmission technology mainly uses magnetic induction type transmissions and self resonance type transmissions.

Magnetic induction type charging is used with a device and a charger relatively close to each other, generates electromagnetic waves by supplying alternating current (AC) power to a transmission coil, transmits an induction current having the same frequency as that of a receiving coil, coupled to the transfer coil, and performs charging with an induction current.

Self resonance type charging is undertaken using magnetic resonant coupling between a transmission unit and a reception device "charging target," "target charging device" or "charging device" are also used). In the case of a transmission antenna, a magnetic field generated by AC power applied by a source coil is applied to a resonance coil of a transmission antenna by inductive coupling. Then, self-resonant coupling occurs between the resonance coil of the transmission antenna and the receiving antenna having the same resonant frequency, which in turn causes inductive coupling to a load coil and applies current to a load.

Self resonance type charging allows electrical power to be transmitted up to several meters, as compared to the magnetic induction type charging, allows multiple terminals in a single wireless charger body to be charged, and can perform charging, even if centers of transmission and reception coils are not exactly aligned with each other.

However, depending on the characteristics of the antenna, there may be a large variation according to the position of the antenna when multiple terminals are charged. That is, when reception devices are placed above an antenna of the wireless charger to be charged, a difference in charging speeds depending on position may occur, and thus, product reliability may be deteriorated.

SUMMARY OF THE INVENTION

The present disclosure has been made in view of the above-mentioned problems, and an object of the present disclosure is to provide an antenna for wireless power transmission, capable of ensuring a uniform charging speed irrespective of position.

In order to solve the above-mentioned problems, provided is an antenna for power transfer, including a first coil portion including a first outer coil portion and a first inner coil portion, and a second coil portion including a second outer coil portion and a second inner coil portion, the first coil portion and the second coil portion being disposed to overlap and intersect each other at one or more points. Here, in a state in which the first coil portion and the second coil portion are overlapped, bends of the first coil portion and the second coil portion may overlap and intersect each other. Here, all of the bends of the first outer coil portion may be located above the bends of the second outer coil portion or all of the bends of the second outer coil portion may be located above the bends of the first outer coil portion.

In addition, a spacing of coils of the first outer coil portion and the second outer coil portion may correspond to a cross-sectional diameter of the coils.

In addition, each of the first inner coil portion and the second inner coil portion may include an inner bend. Here, in a state in which the first coil portion and the second coil portion are overlapped, an inner bend of the first inner coil portion may be located above the inner bend of the second inner coil portion or an inner bend of the second inner coil portion may be located above the inner bend of the first inner coil portion.

In addition, the first coil portion may include a first end portion connected to the first outer coil portion and a second end portion connected to the first inner coil portion, the second coil portion may include a first end portion connected to the second outer coil portion and a second end portion connected to the second inner coil portion. Here, a coil connecting the second end portion of the first coil portion and the first inner coil portion may be disposed to pass below the first outer coil portion and above the second outer coil portion, and a coil connecting the second end portion of the second coil portion and the second inner coil portion may be disposed to pass above coils of the first outer coil portion and the second outer coil portion.

In addition, each of the first outer coil portion and the second outer coil portion may have a spiral structure included of concentric double rectangles having different sizes. Here, the vertices of each rectangle in the double rectangular spiral structure may be curved.

In addition, a spacing of coils of the first outer coil portion and the second outer coil portion may be 1.5 to 2.5 times a cross-sectional diameter of the coils. Here, a spacing of coils of the first inner coil portion and the second inner coil portion may be 9 to 11 times a cross-sectional diameter of the coils. In addition, a spacing between a coil located outermost of the first inner coil portion and the second inner coil portion and a coil located innermost of the first outer coil portion and the second outer coil portion may be 9 to 11 times a cross-sectional diameter of the coils.

In addition, a ratio of a length to a width of a coil located outmost 60% to 70%.

According to the present disclosure, since the positions of coils and the spacing between coils may be adjusted to provide uniform resonance across the entire area, it is possible to prevent the occurrence of variations in charging efficiency, depending on position.

BRIEF DESCRIPTION OF THE DRAWINGS

FIG. 4 is an S-parameter measurement table of the antenna for wireless power transmission of FIG. 1.

FIG. 5 is a table of reference values of a receiving side.

FIG. 6 is a current measurement result table of the present disclosure.

DETAILED DESCRIPTION OF THE INVENTION

Figure 1:
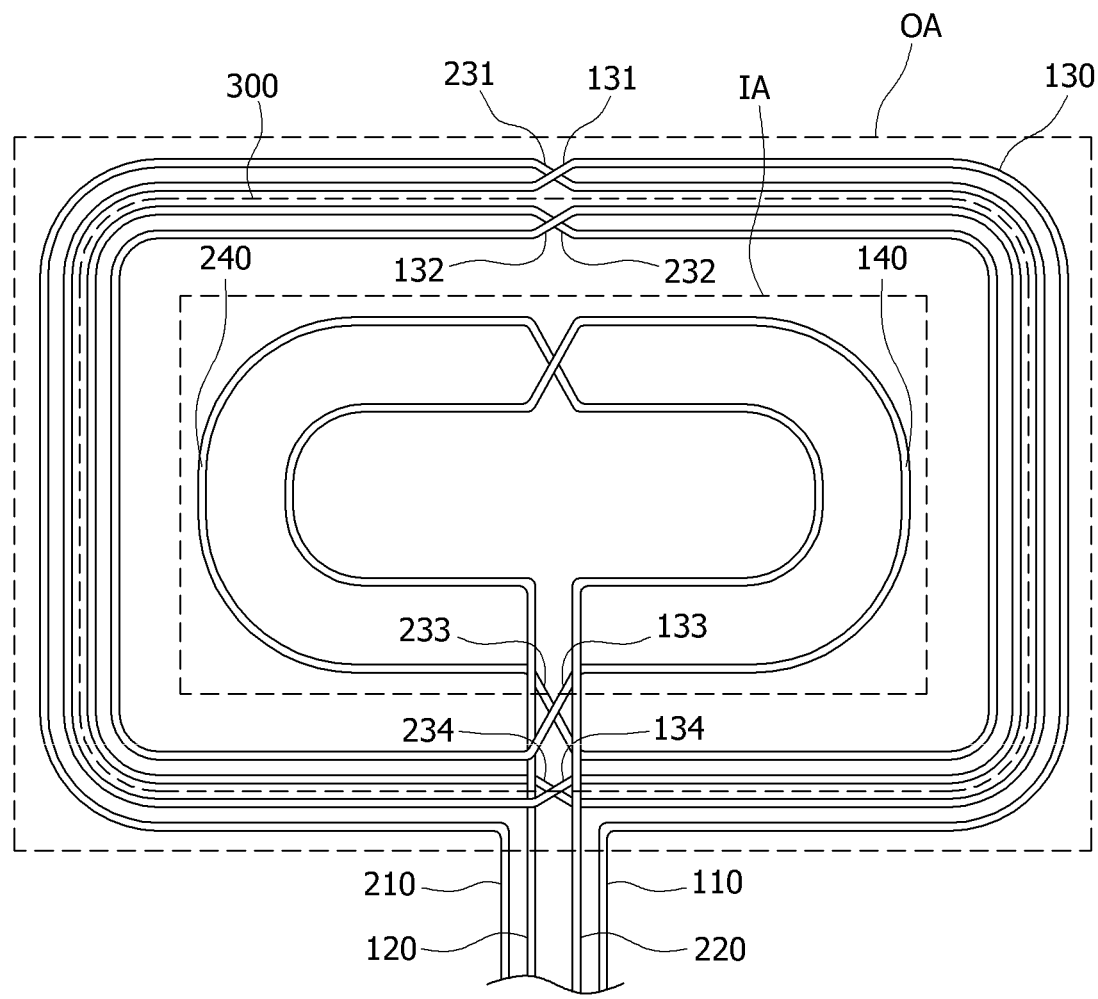
FIG. 1 is a plan view illustrating an antenna for wireless power transmission according to an embodiment of the present disclosure.

Hereinafter, embodiments of the present disclosure will be described in detail with reference to the accompanying drawings so that those skilled in the art can easily carry out the present disclosure. The present disclosure may be embodied in many different forms and is not limited to the embodiments described herein. In the drawings, parts not relating to the description may be omitted for clarifying the present disclosure, and the same reference numerals may be assigned to the same or similar components throughout the specification.

Figure 2:
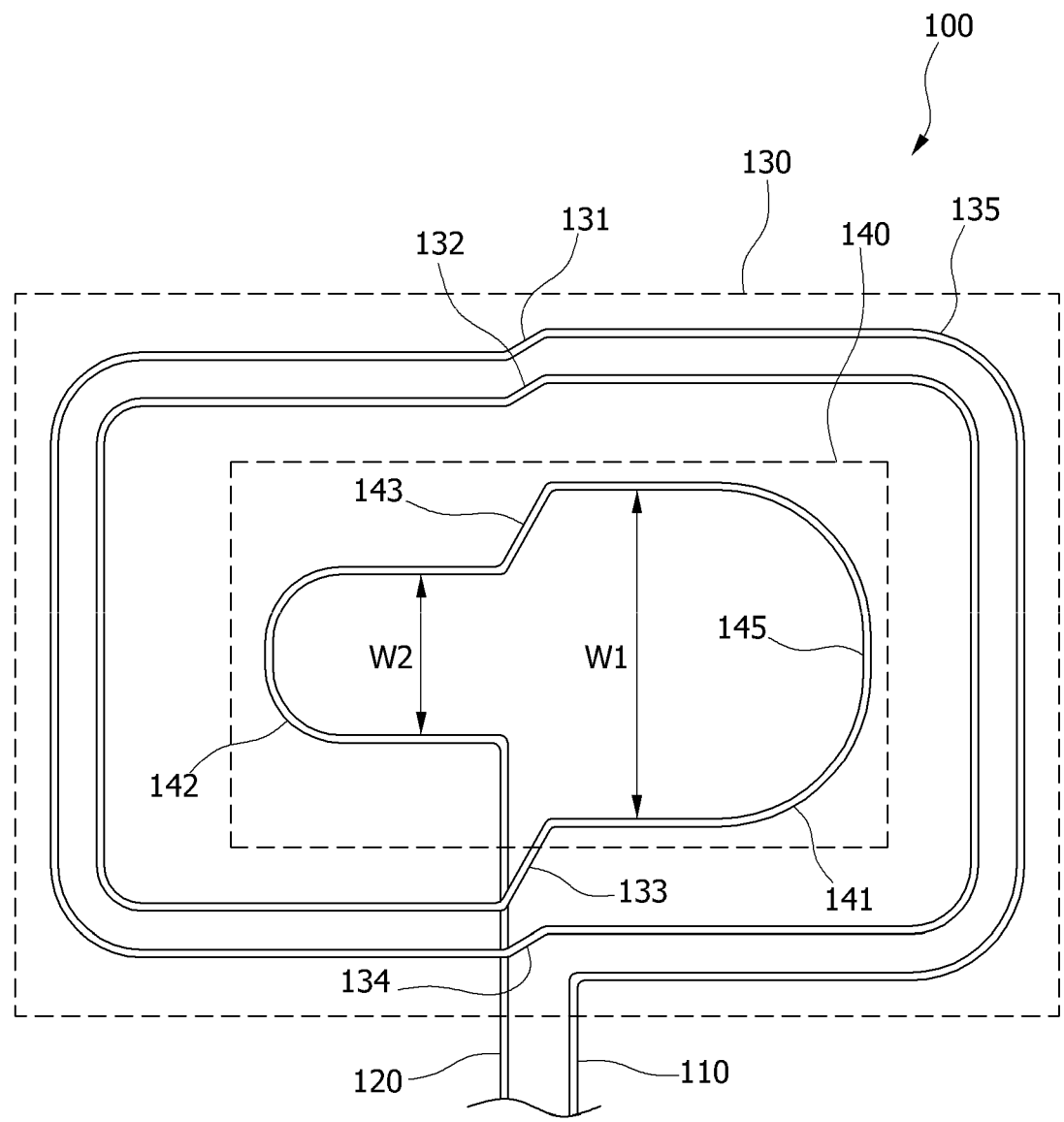
FIG. 2 is schematic diagram views illustrating a configuration of a first coil portion in the antenna for wireless power transmission of FIG. 1.
Figure 3:
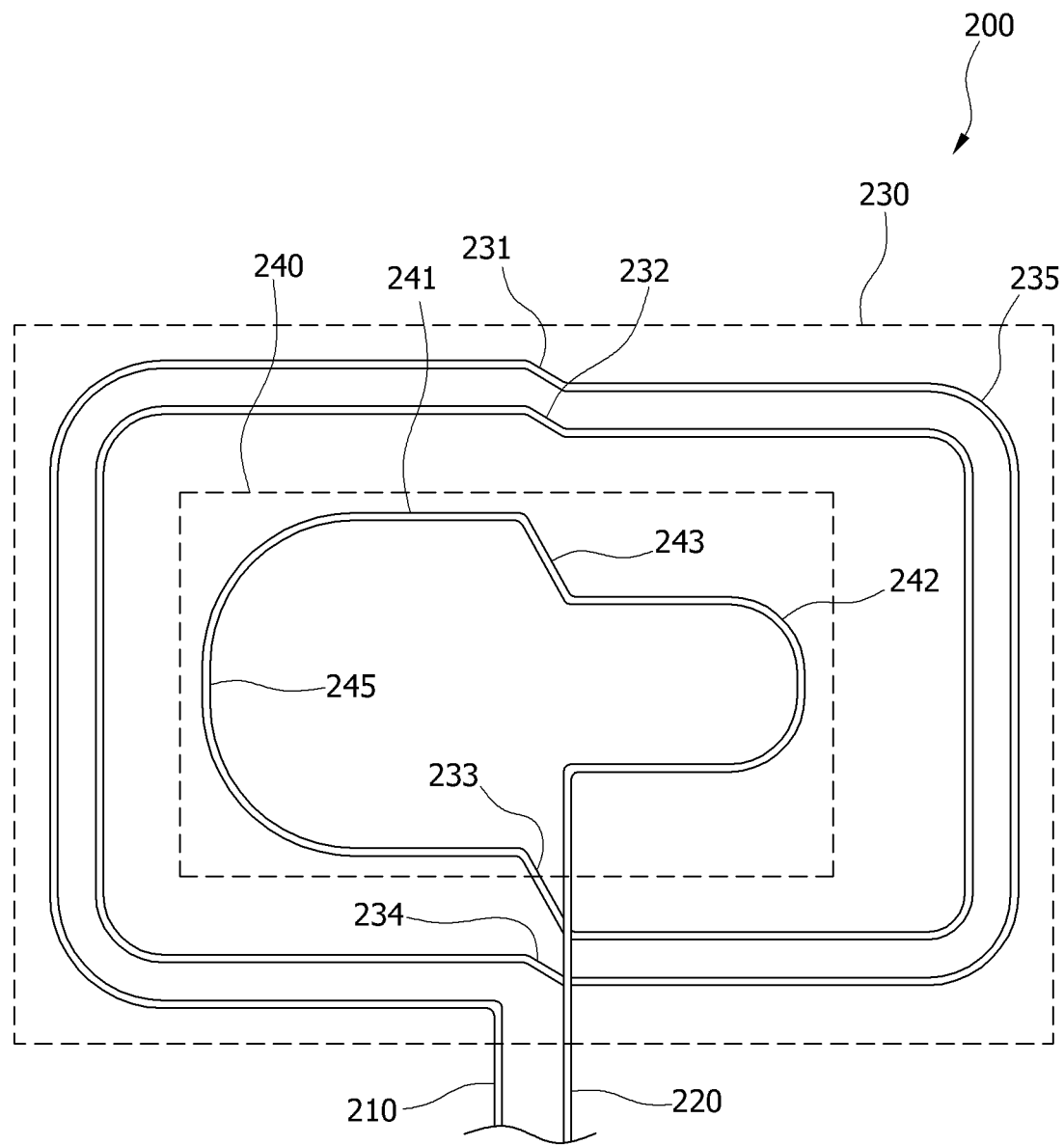
FIG. 3 is schematic diagram views illustrating a configuration of a second coil portion in the antenna for wireless power transmission of FIG. 1.

As illustrated in FIGS. 1 to 3, an antenna for wireless power transmission according to an embodiment of the present disclosure includes a first coil portion 100 and a second coil portion 200. The first coil portion 100 and the second coil portion 200 may be disposed to overlap each other. The first coil portion 100 and the second coil portion 200 may be partially disposed in an inner coil area IA and an outer coil area OA, respectively.

Hereinafter, specific shapes and disposition relationships of the first coil portion 100 and the second coil portion 200 will be described in detail.

The first coil portion 100 may include a first end portion 110 and a second end portion 120 disposed in parallel, spaced apart from each other by a predetermined distance. The first outer coil portion 130 may be disposed in the outer coil area OA, and the first inner coil portion 140 may be disposed in the inner coil area IA.

The second coil portion 200 may include a first end portion 210 and a second end portion 220 disposed in parallel, spaced apart from each other by a predetermined distance. The second end portion 220 may be located between the first end portion 110 and the second end portion 120 of the first coil portion 100. In addition, the second outer coil portion 230 may be located in the outer coil area OA, and the second inner coil portion 240 may be located in the inner coil area IA.

The first coil portion 100 and the second coil portion 200 are, for example, conductive wires, such as copper wires, having a coil cross-sectional diameter of 2 mm, and at least a portion of the first outer coil portion 130 and at least a portion of the second outer coil portion 230 disposed in the outer coil area OA may intersect each other. The first outer coil portion 130 and the second outer coil portion 230 may be symmetrically configured about a vertical imaginary line in the center. Although the cross-sectional diameter of the coil was illustrated as being 2 mm, the embodiment of the present disclosure is not limited thereto, and the cross-sectional diameter of the coil may be increased or reduced according to the size and/or capacity of a wireless power transmission apparatus.

To provide such spiral structures as described above, the first outer coil portion 130 and the second outer coil portion 230 may include first to fourth bends 131 to 134 and 231 to 234, respectively. The first to fourth bends 131 to 134 and 231 to 234 may linearly connect outer portions and inner portions of the spiral structures in diagonal directions.

When the first coil portion 100 and the second coil portion 200 overlap, each of the first to fourth bends 131 to 134 of the first outer coil portion 130 and the first to fourth bends 231 to 234 of the second outer coil portion 230 may overlap at corresponding positions, intersecting each other in diagonal directions.

The first to fourth bends 131 to 134 of the first outer coil portion 130 may be located above the first to fourth bends 231 to 234 of the second outer coil portion 230, or the first to fourth bends 231 to 234 of the second outer coil portion 230 may be located above the first to fourth bends 131 to 134 of the first outer coil portion 130, However, in different intersection positions as in a case in which the first bend 131 of the first outer coil portion 130 intersects the first bend 231 of the second outer coil 230, located above the first bend 231, and the second bend 132 of the first outer coil portion 230 intersects the second bend 232 of the second outer coil portion 230, located below the second bend 232, it is impossible to uniformly supply power.

In addition, the first coil portion 100 and the second coil portion 200 may include a first inner coil portion 140 and a second inner coil portion 240 located in the inner coil area IA, respectively.

The left side may be an inner side portion 142 and the right side may be an outer side portion 141, with respect to the first inner coil portion 140 and a vertical imaginary line in the center. The inner bend 143 may be configured such that the width w1 of the outer side portion 141 is greater than the width w2 of the inner side portion 142.

The second inner coil portion 240, configured symmetrical to the first inner coil portion 140, may have an outer side portion 241 on the left side and an inner side portion 242 on the right side. The inner bend 243 may be configured such that the width of the outer side portion 241 is greater than the width of the inner side portion 242

The inner bend 143 of the first inner coil portion 140 and the inner bend 243 of the second inner coil portion 240 may intersect each other in a diagonal direction. The inner bend 143 of the first inner coil portion 140 may intersect the inner bend 243 of the second inner coil portion 240, located above the inner bend 243.

Consequently, the first coil portion 100 and the second coil portion 200 may be uniformly disposed such that the first coil portion 100 is located above the second coil portion 200 or the second coil portion 200 is located above the first coil portion 200, at all of the intersections of the first coil portion 100 and the second coil portion 200.

Each of the first coil portion 100 and the second coil portion 200 may include the first end portion 110 or 210 and the second end portion 120 or 220. The first end portion 110 of the first coil portion 100 is connected to the first outer coil portion 130, and the first end portion 210 of the second coil portion 200 is connected to the second outer coil portion 230. The first coil portion 100 and the second coil portion 200 may be disposed in parallel to each other.

In addition, the second end portion 120 of the first coil portion 100 is connected to the first inner coil portion 140, and the second end portion 220 of the second coil portion 200 is connected to the second inner coil portion 240.

The end portions may be disposed such that the first end portion 210 of the second coil portion 200, the second end portion 120 of the first coil portion 100, the second end portion 220 of the second coil portion 200, and the first end portion 110 of the first coil portion 100 are disposed sequentially from the left in the drawing.

A coil connecting the second end portion 120 of the first coil portion 100 and the first inner coil portion 140 may be configured to overlap and intersect the first and second outer coil portions 130 and 230. The coil connecting the second end portion 120 and the first inner coil portion 140 may be disposed to pass below the first outer coil portion 130 and above the second outer coil portion 230.

In addition, the coil connecting the second end portion 220 of the second coil portion 200 and the second inner coil portion 240 may be disposed to pass above the coils of the first outer coil portion 130 and the second outer coil portion 230.

The above-described disposition relationship of the two coils, i.e. the first coil portion 100 and the second coil portion 200, is effective on the characteristics of the antenna, and may be effective not only to the general characteristics for reducing parasitic capacitance and increasing inductance, but also to uniformity across the entire area associated with the purposes of the present disclosure.

In addition to the intersection and overlapping relationship of the two coils as described above, components effective on the characteristics of an antenna will be described in more detail below.

Each of the first outer coil portion 130 and the second outer coil portion 230 may have a spiral structure having double patterns, which are substantially concentric and substantially rectangular. The vertex portions of the rectangular shape may be curved portions 135 and 235 having a predetermined curvature.

In addition, the first to fourth bends 131 to 134 and 231 to 234 may be provided at the intersections of the first outer coil portion 130 and the second outer coil portion 230. In a state in which the first coil portion 130 and the second coil portion 230 are overlapped, the aspect ratio of the width and the length of the outermost portions of the coils may preferably be in the range of 60 to 70%. In an embodiment of the present disclosure, the coil used herein may be have a size of 260 mm in width and 170 mm in length and an aspect ratio of 65.4%. In addition, in a state in which the first coil portion 130 and the second coil portion 230 are overlapped, the outermost portions of the coils are rectangular patterns having the same center points, different sizes, and rounded vertices.

The first outer coil portion 130 and the second outer coil portion 230 disposed in the outer coil area OA overlap each other, in which the spacing between the coils may be 3 to 5 mm, which is 1.5 to 2.5 times the coil cross-sectional diameters of the first coil portion 100 and the second coil portion 200. Most particularly, the spacing may be 4 mm, which is twice the coil cross-sectional diameter. The coil spacing as discussed above is adjusted to be suitable to the width and length of the outermost portions the coils in a state in which the first outer coil portion 130 and the second outer coil portion 230 are overlapped as described above.

The above-described spacing may be equally applied to curved portions 135 and 235.

The first inner coil portion 140 and the second inner coil portion 240 may be symmetrical about a vertical imaginary line of the center, in which the parallel sides located to the left and right of the vertical line in the center may be curved portions 145 and 245 having a predetermined curvature.

In a state in which the first inner coil portion 140 and the second inner coil portion 240 are overlapped, the aspect ratio of the width and the length of the outermost portions of the coils may be in the range of 45 to 55%. In an embodiment of the present disclosure, the coil used herein may have a size of 180 mm in width and 90 mm in length and an aspect ratio of 50%. The first inner coil portion 140 and the second inner coil portion 240 may be patterned such that the left and right portions are semicircular. Here, the aspect ratio may also be adjusted in the range of 45 to 55%.

In addition, the spacing between the outer side portion 141 of the first inner coil portion 140 and the inner side portion 242 of the second inner coil portion 240 and the spacing between the inner side portion 142 of the first inner coil portion 140 and the outer side portion 241 of the second inner coil portion 240 depend on the coil cross-sectional diameters of the first coil portion 100 and the second coil portion 200, respectively, and may be 9 to 11 times the coil cross-sectional diameters. For example, when the coil cross-sectional diameter is 2 mm, the above-described spacings between the coils may be maintained in 18 to 22 mm. Here, most particularly, the spacing between the above-described coils may be 20 mm, which is 10 times the coil cross-sectional diameter.

In addition, in the first outer coil portion 130 and the second outer coil portion 230, the spacing between the first coil portion 100 and the second coil portion 200 also depends on the coil cross-sectional diameters of the first coil portion 100 and the second coil portion 200, and may be 1.5 times to 2.5 times the coil cross-sectional diameters. For example, when the coil cross-sectional diameter is 2 mm, the above-described spacing between the coils may be maintained in the range of 3 to 5 mm.

In an embodiment of the present disclosure, a symmetrical structure is formed due to the first inner coil portion 140 and the second inner coil portion 230 overlapping each other with a coil spacing of 20 mm and the first outer coil portion 140 and the second outer coil portion 230 overlapping each other with a coil spacing of 4 mm. The spacing between the innermost coil among the outer coil portions and the outermost coil among the inner coils may be 18 to 22 mm, which may be 9 to 11 times the coil cross-sectional diameter. Most particularly, the spacing may be 20 mm, which is 10 times the coil cross-sectional diameter.

The spacing between the coils in the first inner coil portion 140 and the second inner coil portion 240 may be 18 to 22 mm, which is 4.5 to 4.5 times the spacing between the coils in the first outer coil portion 130 and the second outer coil portion 230.

Due to the shape and disposition of the first coil portion 100 and the second coil portion 200, a charging area 300 of the present disclosure may be disposed in the outer coil area OA, including the spacing between the first bends 131 and 231 and the second bends 132 and 232 of the first outer coil portion 130 and the second outer coil portion 230. The width of charging area 300 may be 260 mm and the length charging area 300 may be 150 mm.

Since the characteristics of an antenna are significantly changed even in the case that there is a slight difference in the shape, disposition, size, cross-sectional diameter, or material of the coil, it is very difficult to realize the characteristic disposition relationships of the present disclosure, as specifically described above, by simply repeating various experiments. Although antennas having other structures, as well known in the art, may have better resonance characteristics due to lower levels of parasitic capacitance and higher inductance values than the present disclosure, these antennas cannot provide a uniform charging function over the entire area.

The present disclosure exhibits a proper inductance value due to the ratio between the cross-section diameter and the spacing of coils, the shape and the spacing of the outer coil portion and the inner coil portion, the characteristic configuration of a portion in which two strands of coil overlap, and in particular, can provide a uniform charging function over the entire area.

As illustrated in FIG. 4, the S parameter measured in an antenna for wireless power transmission according to an embodiment of the present disclosure has a small S parameter deviation between the charging area 300 and the areas other than the charging area 300. It is thereby possible to obtain a charging effect uniformly distributed over the entire area.

FIGS. 5 and 6 illustrate reference values of a receiving part and current measurements obtained according to the present disclosure, respectively.

The present disclosure satisfies the range of reference values of the receiving part, due to the above-described configuration.

Although the foregoing embodiments of the present disclosure have been described above, the spirit of the present disclosure is not limited to the embodiments set forth herein. A person skilled in the art who understands the spirit of the present disclosure may readily suggest other embodiments by adding, changing, deleting, or the like to components within the scope of the same concept, and all such changes are included within the spirit of the present disclosure.

What is claimed is:

1. An antenna for wireless power transmission comprising:
   a first coil portion comprising a first outer coil portion and a first inner coil portion; and
   a second coil portion comprising a second outer coil portion and a second inner coil portion, wherein the first coil portion and the second coil portion overlap and intersect each other at one or more points, wherein
   each of the first outer coil portion and the second outer coil portion comprises a plurality of bends,
   each of the first inner coil portion and the second inner coil portion comprises one inner bend,
   the plurality of bends of the first outer coil portion and the plurality of bends of the second outer coil portion overlap and intersect each other, and the one inner bend of the first inner coil portion and the one inner bend of the second inner coil portion overlap and intersect each other,
   the first coil portion is located above the second coil portion at an intersection of the first coil portion and the second coil portion, or the second coil portion is located above the first coil portion at the intersection of the first coil portion and the second coil portion,
   each of the first outer coil portion and the second outer coil portion has a spiral structure comprised of concentric double rectangles having different sizes,
   vertices of the concentric double rectangles of the spiral structure are curved, and
   the first outer coil portion and the second outer coil portion consist of four (4) concentric rectangles.

2. The antenna of claim 1, wherein the first coil portion further comprises a first end portion of the first coil portion connected to the first outer coil portion and a second end portion of the first coil portion connected to the first inner coil portion,
   the second coil portion further comprises a first end portion of the second coil portion connected to the second outer coil portion and a second end portion of the second coil portion connected to the second inner coil portion,
   a coil connecting the second end portion of the first coil portion and the first inner coil portion is disposed to pass below the first outer coil portion and above the second outer coil portion, and
   a coil connecting the second end portion of the second coil portion and the second inner coil portion is disposed to pass above coils of the first outer coil portion and the second outer coil portion.

3. The antenna of claim 1, wherein a spacing of coils of the first outer coil portion and the second outer coil portion is 1.5 to 2.5 times a cross-sectional diameter of the coils.

4. The antenna of claim 1, wherein, a spacing of coils of the first inner coil portion and the second inner coil portion is 9 to 11 times a cross-sectional diameter of the coils.

5. The antenna of claim 1, wherein, a spacing between a coil located outermost of the first inner coil portion and the second inner coil portion and a coil located innermost of the first outer coil portion and the second outer coil portion is 9 to 11 times a cross-sectional diameter of the coils.

6. The antenna of claim 1, wherein, a ratio of a length to a width of a coil located on an outermost portion is 60% to 70%.

7. The antenna of claim 1, wherein a spacing of coils of the first outer coil portion and the second outer coil portion corresponds to a cross-sectional diameter of the coils.

* * * * *